United States Patent [19]
Lueker

[11] Patent Number: 6,134,105
[45] Date of Patent: Oct. 17, 2000

[54] PORTABLE COMMAND CENTER

[76] Inventor: Mark David Lueker, 1265 Van Horne Ave., Hermosa Bch, Calif. 90254

[21] Appl. No.: 09/003,563

[22] Filed: Jan. 6, 1998

[51] Int. Cl.[7] .............................. G06F 1/16; A45C 5/12; A45C 5/14; B65D 85/38

[52] U.S. Cl. .................... 361/683; 206/320; 206/576; 346/145

[58] Field of Search .................. 361/679, 683; 206/576, 305, 320; 364/708.1; 346/145

[56] References Cited

U.S. PATENT DOCUMENTS

| | | | |
|---|---|---|---|
| 4,837,590 | 6/1989 | Sprague | 346/145 |
| 4,896,776 | 1/1990 | Kabanuk et al. | 206/576 |
| 4,929,948 | 5/1990 | Holmberg | 364/708.1 |
| 5,010,988 | 4/1991 | Brown | 206/320 |
| 5,160,001 | 11/1992 | Marceau | 206/320 |
| 5,212,628 | 5/1993 | Bradbury | 361/683 |
| 5,242,056 | 9/1993 | Zia et al. | 206/576 |
| 5,325,970 | 7/1994 | Dillon et al. | 206/576 |
| 5,400,903 | 3/1995 | Cooley | 206/320 |
| 5,437,367 | 8/1995 | Martin | 206/320 |
| 5,485,922 | 1/1996 | Butcher | 206/320 |
| 5,494,157 | 2/1996 | Golenz et al. | 206/320 |
| 5,552,957 | 9/1996 | Brown et al. | 361/683 |
| 5,647,484 | 7/1997 | Fleming | 206/576 |
| 5,676,223 | 10/1997 | Cunningham | 206/320 |
| 5,762,170 | 6/1998 | Shyr et al. | 206/320 |
| 5,808,865 | 9/1998 | Alves | 361/685 |
| 5,862,392 | 1/1999 | Charkey et al. | 364/708.1 |

*Primary Examiner*—Leo P. Picard
*Assistant Examiner*—Lisa Lea-Edmonds

[57] ABSTRACT

A versatile and highly portable command center comprised of a standard carrying case with carrying attachments such as handles, backpacking straps and wheels; said case encloses multiple, operationally connected electronic equipment such as a computer, RF transmission media, printer, scanner, fax, copier, flexible gooseneck type light, Global Positioning System, digital camera, and electronic enclosure with AC/DC/Battery power electronics and control panel. A first deployable bracket is used to move the computer into a convenient operator position. A second deployable bracket system contains the printer and scanner, copier, fax units and is attached to the case in a position providing convenient operational access to the printer and scanner, copier, fax units. Storage for operator supplies such as paper, diskettes, cables, antennas are also included.

1 Claim, 4 Drawing Sheets

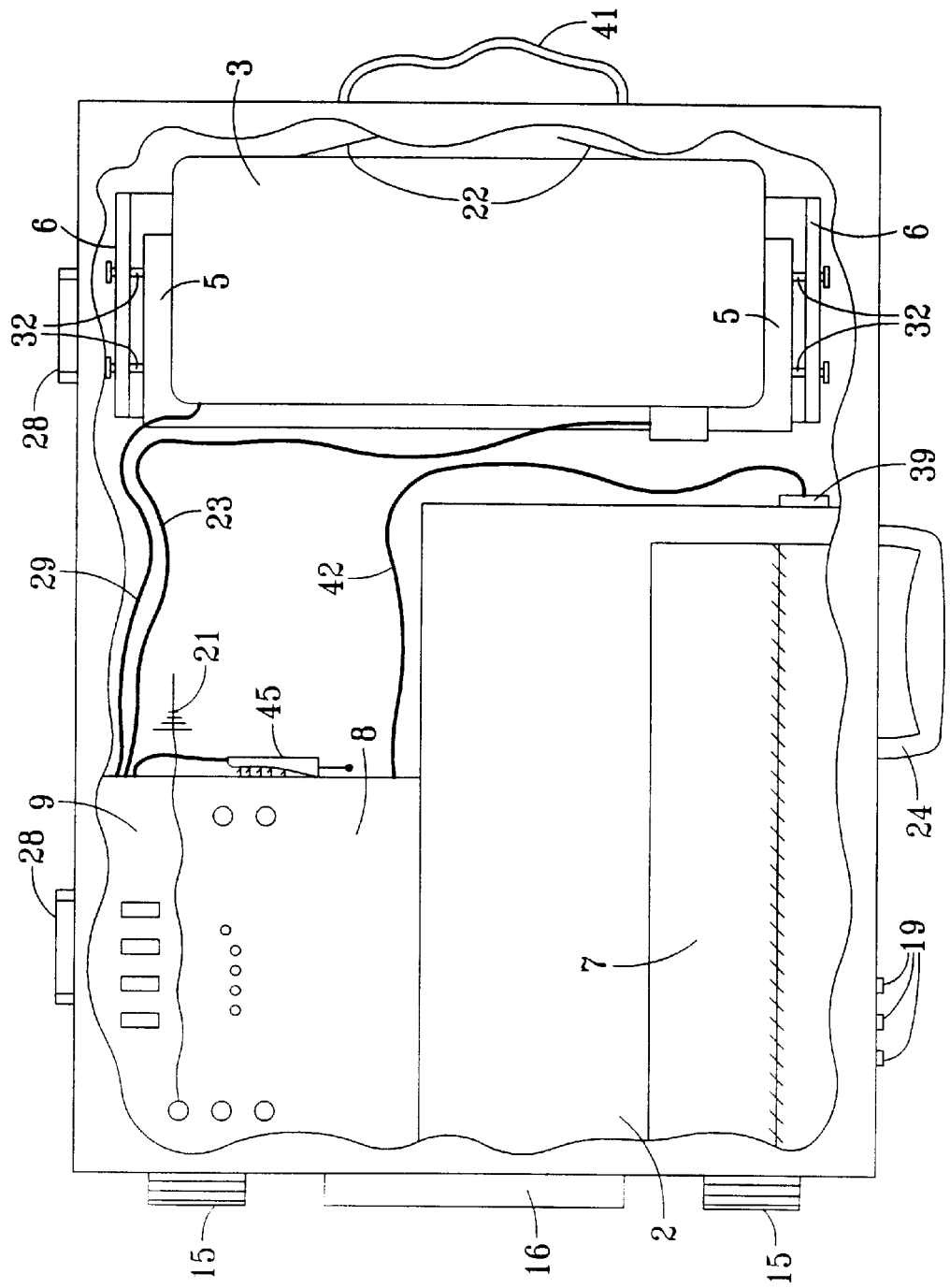

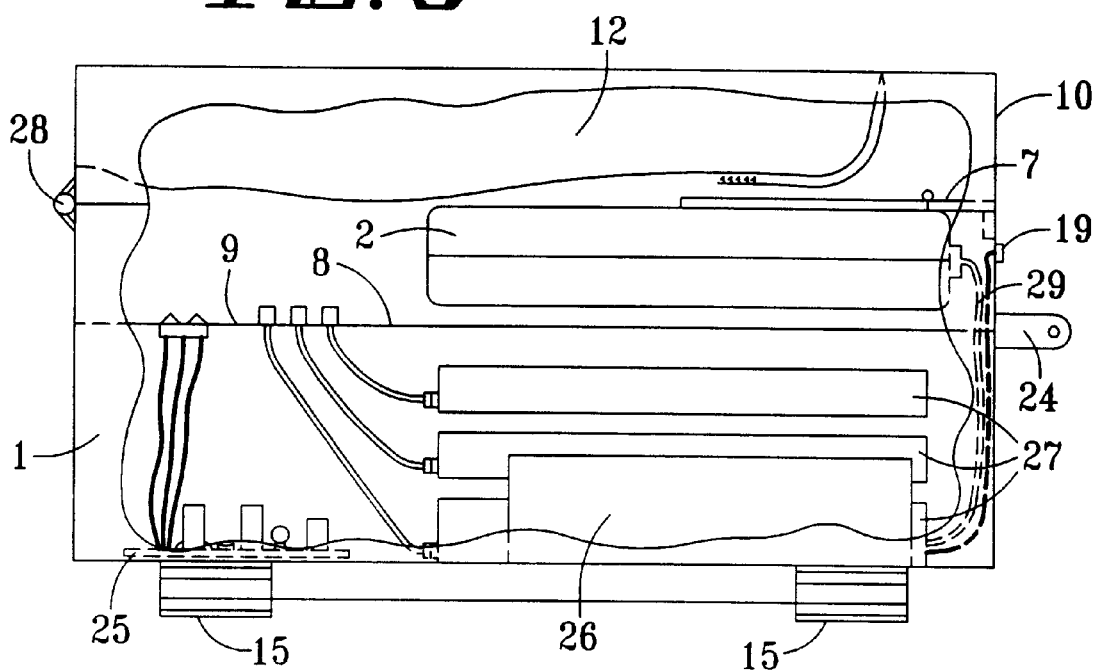
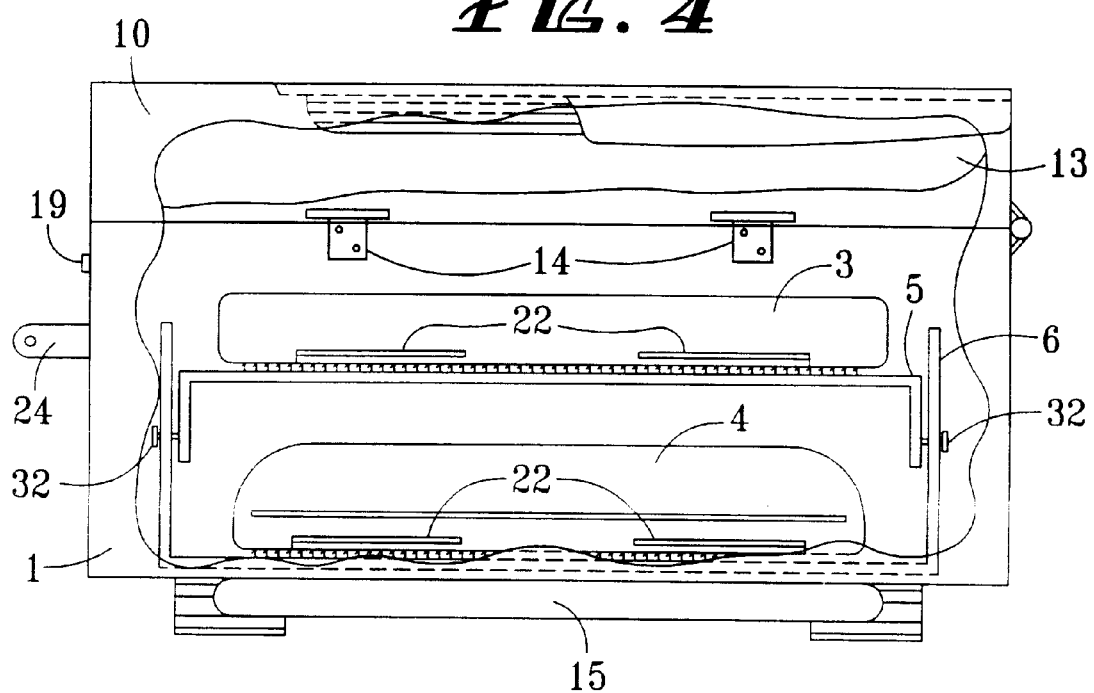

PORTABLE COMMAND CENTER

FIELD OF THE INVENTION

This invention relates to a portable command center incorporating a plurality of electronic components which are interconnected in a pre-connected operating state within a single, self contained carrying case. Operation of the command center simply requires opening the case, deploying the bracket mounted equipment, and turning on the power.

DESCRIPTION OF THE PRIOR ART

Portable computers and printers have been in use for many years by field personnel and data collection technicians. This portability is advantageous to the user by enabling the work unit to be carried to the preferred work location. Past manifestations of this concept have typically included a case design and storage for the computer and printer and supplies.

These past solutions are shown in one or more of the following U.S. Patents.

| U.S. Pat. No. | Inventor | Date |
| --- | --- | --- |
| 5,552,957 | George Brown | Sept 3, 1996 |
| 5,242,056 | Farrukh Zia | Sept 7, 1993 |
| 4,837,590 | Glenn Sprague | June 6, 1989 |
| 5,647,484 | Daniel Fleming | July 15, 1997 |

These attempts to provide computing power and information management at remote sites do not meet the needs of today's public safety (police/fire) personnel. Unmet needs include a rapid deployment for immediate unit operation, connectivity via RF or landline to outside sites, flexible light for night use, external case power indicators, multiple functions in addition to the pedestrian computer and printer combination, secure and protective electronic equipment storage and transfer. For example, after hiking to a remote site such as a freeway or mountain top, a public safety officer may need to send and receive a fax while connected to the Internet and the central dispatch system; digitally record site audio and video images for transfer to another location, copy forms, print out reports, integrate Geographical Information with Global Positioning System location information.

Prior art attempts to solve these remote communication needs have only partially succeeded. These conventional units may require multiple cases to carry the equipment, which is inconvenient for the user and limits the useable locations. The prior art may also require external AC or DC power sources for operation, which again limits the usable locations. The prior art is also typically composed of a printer and computer, which provides limited functionality for the user. These prior art units may not be connected in an operable manner, which requires the user to spend precious time interconnecting the units to gain functionality.

As a result, it would be desirable to have available a single, easily transported command unit which provides a fully functional, easily deployed and immediately operable communications and information transfer capability to users in remote locations. This command center would replicate and provide the functionality of a home agency information and computing system to a user at a remote site.

SUMMARY OF THE INVENTION

Accordingly, it is an object of the present invention to provide an improved portable command center comprised of an impact resistant case containing a plurality of electronic equipment. This equipment is operably interconnected for immediate usage and may include a computer, printer, scanner, copier, fax, digital camera, RF transmission units, modems, flexible light, control panel, power supply, and batteries.

It is a further object to enable convenient operation of the interconnected units in totality from within the case.

In carrying out the invention, the lockable case is composed of an impact resistant substance and incorporates features which provide a measure of exclusion from the outside environment when closed. Attached to the case are multiple appendages for grasping and carrying the case. These appendages include rigid and flexible handles, backpack type shoulder straps, and wheel set with deployable handle. During storage the entire equipment suite is contained within the case, and external power may be applied from any convenient AC or DC source. External lighted indicators provide indications of the power state within the case electronics and battery.

When opened, the top portion of the case contains a flexible 'gooseneck" type light providing luminescence to the entire unit during darkness. The top also contains a storage area secured by a hook and loop system (commonly known as Velcro) which contains the power cords, antennas, telephone lines, and associated command center cabling and hardware. The case top also incorporates a separate storage area for storage of supplies such as paper, pencils, computer diskettes, digital camera and external floppy drives.

Located in the case bottom is an electronics enclosure, computer and deployment bracketry, printer/scanner and deployment bracketry, storage for electronic components, and the external power receptacles and power indicators. The electronics enclosure contains a plurality of electronics including the case power electronics, battery, cellular telephones, and switching and control electronics. These components are mounted using shock resistant means such as rubber isolators. A control panel comprises the horizontal rear portion of the electronic enclosure. The control panel contains power switches, antenna mounting jacks, fuses, and electronic indicators such as power source and battery state of charge.

The computer deployment bracketry is mounted to the vertical case side, and attaches to the computer base via a hook and loop system (commonly known as Velcro). The computer is mounted using shock resistant means such as rubber isolators. The computer is attached to the hinged bracket using a hook and loop system commonly known as Velcro and stowed in an inverted position, and operably connected to the remaining case electronic equipment through cabling into the electronic enclosure. To deploy the computer, the bracket and computer are lifted from above the electronic enclosure and rotated, on the hinge axis, out of the case into a useable position.

The printer and scanner, copier, fax units are mounted (via a hook and loop system commonly known as Velcro) to a separate deployable bracket system. These components are mounted using shock resistant means such as rubber isolators. The mounting configuration provides clearance for the attached document feeders, thereby providing a multipage print, fax, scannner, copier capability. The printer and scanner, copier, fax units are operably attached to the computer through cabling into the electronics enclosure. To deploy the printer and scanner, copier, fax units, the user deploys the interconnected dual bracket mechanism out of the case. Deployable paper supports are provided for both the printer and scanner, copier, fax units to support the printed or scanned paper.

Additional electronics such as portable cellular phones, GPS receivers, and RF radios are attached (via a hook and loop system commonly known as Velcro) to both the case and electronic enclosure bottom and sides. These components are mounted using shock resistant means such as rubber isolators.

DESCRIPTION OF THE FIGURES

FIG. 2 is a plan view of the closed case with a partial cut away illustrating the stowed configuration.

FIG. 3 is right side view of the closed case with a partial cut away illustrating the stowed configuration.

FIG. 4 is a left side view of the closed case with a partial cut away illustrating the stowed configuration.

DETAILED DESCRIPTION OF A PREFERRED EMBODIMENT

Figure 1:
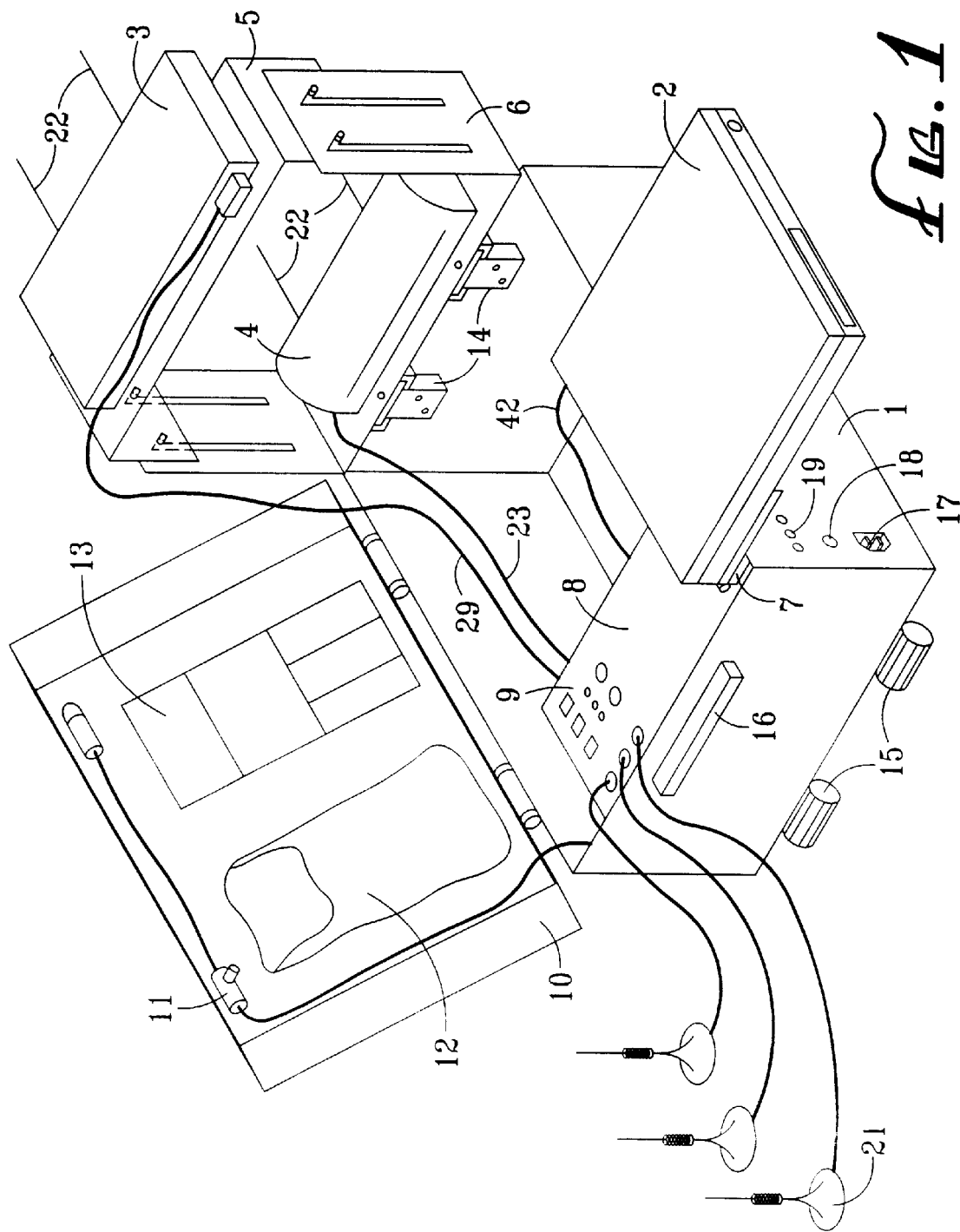
FIG. 1 is a front perspective of the present portable command center with the carrying case shown open, the computer deployed but unopened, the printer and scanner, copier, fax units deployed, and RF antennas attached.

Referring now to FIG. 1, there is shown the portable command center of a preferred embodiment of the present invention. The portable command center includes a lockable carrying case having a hinged 28 lid 10 and a base 1. Externally applied to the carrying case are appendages to assist in manipulating the case. These appendages include a wheeled luggage type carrier with telescoping handle 15, a stand to support the case when in a vertical resting position 16, a hard handle 40, and a flexible handle, 41 in FIG. 2. External indicators 19 provide the user with indications of the power functions such as power source in use and battery state of charge. External receptacles for AC power 17 and DC power 18 provide connectivity to external power sources for charging the internal battery, 26 in FIG. 3, and powering the unit when not running on battery power.

A flexible gooseneck light 11 is attached to the case lid and connects to the power source via wires from the lid to the case electronics enclosure 8. A flexible pouch 12 is attached to the lid which stores accessories such as RF antennas, power cords, digital camera and telephone cords. The flexible pouch is closed and secured by a hook and loop material commonly known as Velcro. A second supply storage area 13 is located adjacent the flexible pouch and attached to the case lid. This supply storage area contains space for items such as paper, pencils, and computer diskettes.

The electronic enclosure 8 is composed of a planar rigid material attached to the case side and base of the bottom portion of the case, thereby forming a protective enclosure containing the case electronics, RF transceivers, battery, battery charger, power supply, and associated electronics. These components are mounted using shock resistant means such as rubber isolators. A control panel 9 is located to the rear of the case in a protected area. The control panel includes control functions such as component power switches, fuses, antenna mounting jacks, conventional telephone jacks, power source indicators, and battery state of charge indicators. RF antennas 21 are attached to the jacks mounted on the control panel and provide RF interface for data and voice transmission, and reception of external signals such as from the Global Positioning System. Power cabling 23 extends from the electronic enclosure to the peripherals including computer 2, printer 3 and scanner, copier, fax units 4. Printer cabling 29 connects the printer and computer, and runs through the electronic enclosure. Modem cabling 42 connects the internal computer modem and/or PCMCIA modems to the RF transceivers within the electronic enclosure. A separate embodiment includes a separate data interface between the modems and the RF transceivers.

The computer 2 is attached to a hinged or otherwise deployable bracket 7 by a hook and loop material commonly known as Velcro. One side of the hinged bracket is composed of an L-shaped material with one edge securely fastened to the vertical side of the case bottom. When in the stowed position the computer is upside down, with the bottom bracket plate visible. Upon deployment, the computer rotates upon the hinge axis into the convenient position illustrated in FIG. 1. Multiple peripherals are attached to the computer. These may include GPS receivers, scanners, printers, digital cameras, video cameras, faxes, and CD-ROMs. These components are mounted using shock resistant means such as rubber isolators. The computer is attached to the printer via cabling 29 in FIG. 3. The computer contains both internal modems, and PCMCIA card modems which connect to the RF transceivers 27 in FIG. 3. An alternate embodiment would include a data interface between the computer modem and the RF transceiver.

The printer 3 and scanner, copier, fax units 4 are attached to a bracket assembly consisting of an upper bracket 5 and a hinged or otherwise deployable lower bracket 6. These brackets enable the printer to be raised and lowered over the scanner, copier, printer units for stowage and deployment. In one embodiment of this invention, the upper bracket contains fixed pins which slide in matching channels in the lower bracket, 33 in FIG. 5. The scanner, copier, fax units is attached to the lower bracket via a hook and loop material commonly known as Velcro. The printer is attached to the upper bracket via a hook and loop material commonly known as Velcro. In the stowed position, the upper bracket, guided by pins in the lower bracket channels, rests slightly above the scanner, copier, fax units. In the deployed position, the upper bracket is raised and guided by the lower bracket channels and secured above the scanner, copier, fax units. The top of the lower bracket channels is configured to use gravity to securely hold the printer above the scanner, copier, fax units. Both the upper and lower brackets have a deployable paper support assembly attached to the individual brackets. Each of these paper support assemblies 22 are composed of a folding and telescoping arm which may be extended to provide support for paper which has passed through the respective printer or scanner, copier, fax units. In one embodiment, this deployed lower bracket assembly is then attached to the side of the case using a spring loaded ball bearing pin and receptacle mechanism 14. Another embodiment could use vertical pins attached to the vertical side of the case bottom and matching holes in the bottom bracket.

FIG. 2 illustrates one embodiment of the stowed command center configuration. In this view the computer 2 is attached to the hinged mounting bracket 7 and stowed in an inverted position. Modem cabling 40 connects the internal or PCMCIA modems 39 to the RF transceivers or data interface. The printer 3 is adjacent the computer and remains attached via the power and data cabling 23 and 29. The upper 5 and lower 6 brackets are connected via sliding pins 32. Peripheral electronics such as cellular telephones 22 and GPS antennas 20 are attached to the electronic enclosure 8 and case bottom 1 via a hook and loop material commonly known as Velcro.

FIG. 3 illustrates the electronics included within the electronic enclosure. In the current embodiment these consists of a power supply and battery charging system 25 which accepts both external AC 17 and DC 18 power, provides power to all case components and charges the case battery 26. RF transceivers 27 are stacked using a hook and loop material commonly known as Velcro and L-shaped brackets attached to the enclosure. The RF transceiver antenna jacks are connected to the control panel 9 in order to interface with the external antenna 21. Input signal to the RF transceivers may come from a direct connection 40 to the computer modems or handset, or through an interface data box.

FIG. 4 illustrates the stowed configuration of the printer 3 and scanner, copier, fax units 4 with associated bracketry. Telescoping paper supports 22 are retracted and folded parallel to the brackets. The upper bracket 5 is lowered over the scanner, copier, fax units guided by the pins 32 and channels, 33 in FIG. 5.

Figure 5:
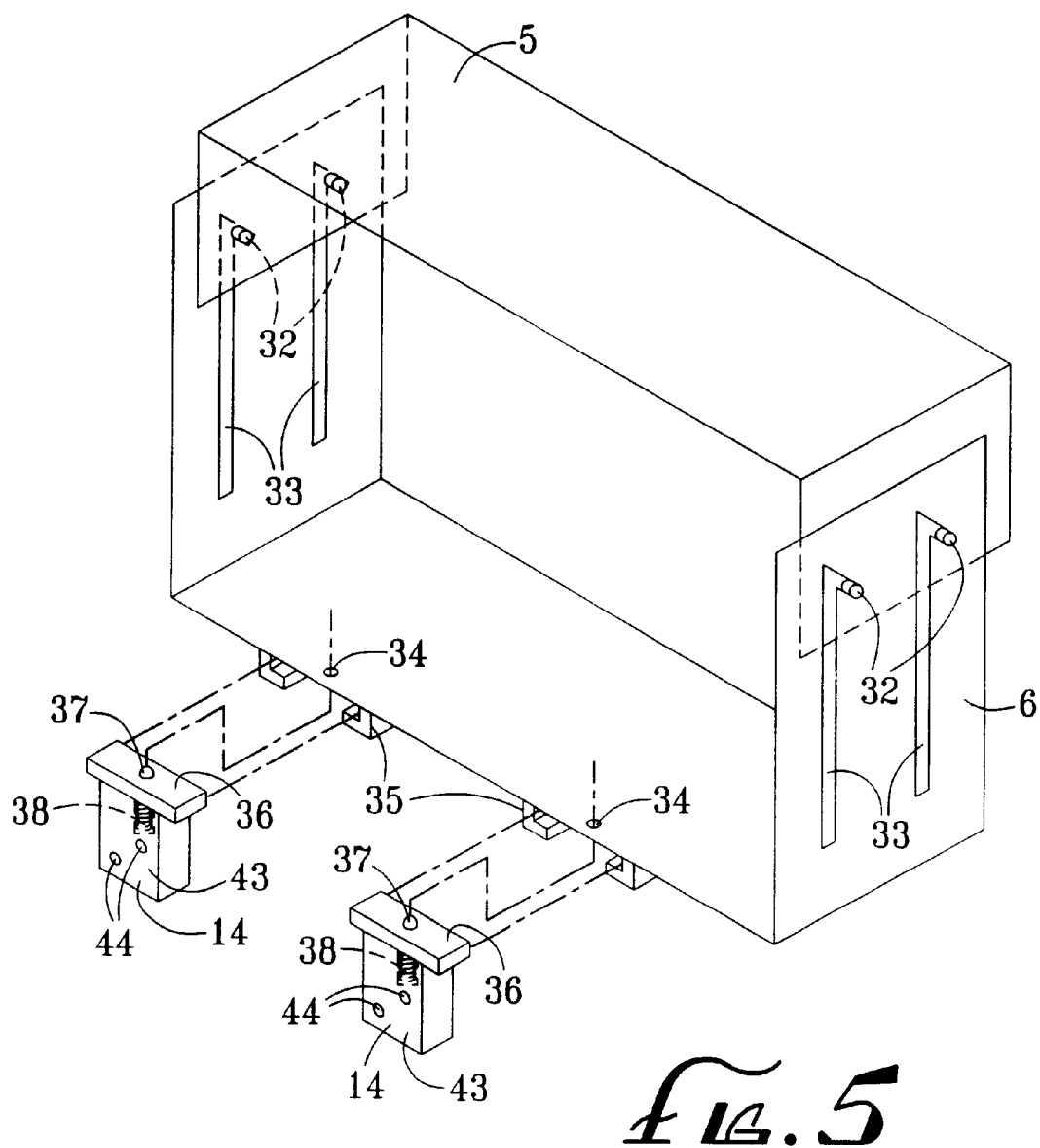
FIG. 5 is a detail view of one of many embodiments of the scanner, copier, fax units deployment bracketry.

Referring to FIG. 5, during deploymentof one of many embodiments, the upper bracket 5 is raised above the lower bracket 6 using the channels 33 and pins 32 as guides. These pins then rest in reverse cut channels at the top of the bracket and use the force of gravity to securely hold the upper bracket in place. In one embodiment, this bracket assembly is attached to the side of the case bottom via a spring loaded ball bearing pin and receptacle assembly 14. The channel pieces 35 are attached to the underside of the bottom bracket and centered over a hole 34 in the bottom bracket. These channels are then slid over the spring loaded ball bearing pin 14 which is mounted to the side of the bottom case. This spring loaded pin is composed of a base unit with transverse drilled mounting holes 44, a top hole containing a spring 38, a ball bearing placed over the spring 37, and a top plate 36 attached to the base unit, and extending past the base unit, which enables the ball bearing to protrude through. When the channel pieces 35 are slid over the top plate 36, the spring loaded ball bearing pops into the hole 34. In another embodiment, vertical pins replace the spring loaded ball bearing assembly 14, and simply slide into matching holes drilled into the bottom bracket 6.

The computer, printer, electronics, and associated peripheral equipment operate together to form a beneficial portable command center which meets the needs of remote site personnel. Those skilled in the art will recognize yet other embodiments of the invention described more particularly by the claims which follow.

What is claimed is:

1. A packaging structure for a portable command center comprising:

a carrying case incorporating multiple handles and appendages for manipulating said case, including but not limited to wheels, flexible handles, hard handles, and support structure; said case provides isolation from the external environment when closed an electronics enclosure within the case which protect and secure the case electronics wherein the electronics provide power for operation and battery charging components, and provides a control panel to control case functions including, but not limited to, switches for controlling power to the electronic case components, RF antenna mounting jacks, fuses, battery charging indicators power supply accepts spare external batteries as a power source, wherein the power supply accepts both AC and DC external sources simultaneously or independently, all internal components are operationally connected in both the stowed and deployed configurations a computer multiple computer peripherals including but not limited to scanners, fax, RF transceivers, copier, digital camera, printer a deployable bracket for positioning the computer into a user friendly orientation a deployable bracket system for positioning the printer and scanner, copier, fax units into a user friendly orientation, said brackets including a paper support mechanism a storage for accessories such as antenna cables, power cords, digital camera and telephone cables, a storage area for accessories such as paper, pencils and computer diskettes.

* * * * *